J. K. BLOGG.
PROCESS AND APPARATUS FOR THE OXYGENATION AND POLYMERIZATION OF OILS.
APPLICATION FILED DEC. 19, 1917.
1,284,572. Patented Nov. 12, 1918.
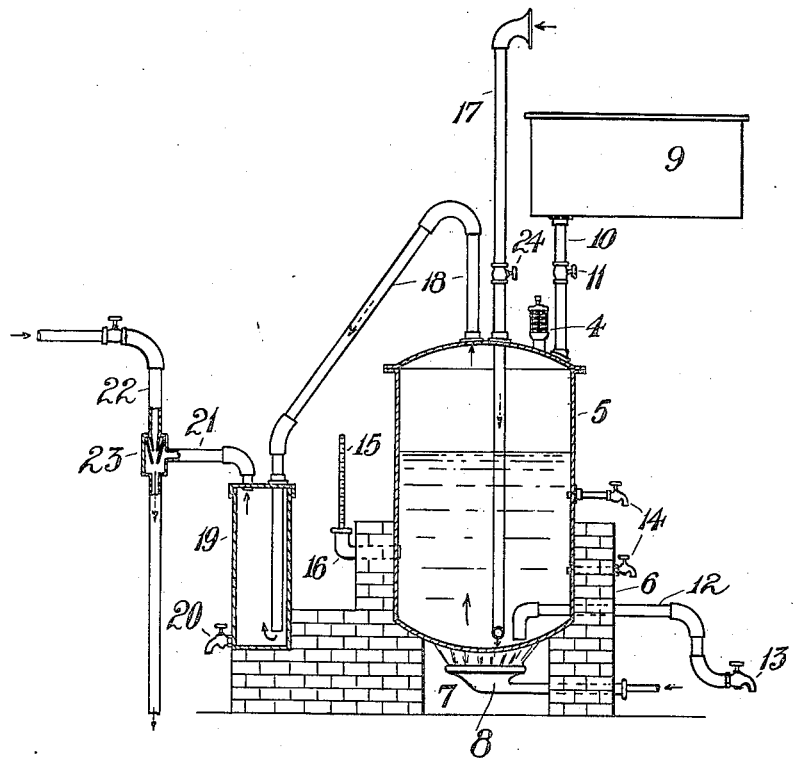

UNITED STATES PATENT OFFICE.

JOHN KENDRICK BLOGG, OF ALBANY CRESCENT, SURREY HILLS, VICTORIA, AUSTRALIA.

PROCESS AND APPARATUS FOR THE OXYGENATION AND POLYMERIZATION OF OILS.

1,284,572.　　　　　　Specification of Letters Patent.　　Patented Nov. 12, 1918.

Application filed December 19, 1917.　Serial No. 207,876.

*To all whom it may concern:*

Be it known that I, JOHN KENDRICK BLOGG, a subject of the King of Great Britain, residing at Albany Crescent, Surrey Hills, in the State of Victoria, Commonwealth of Australia, chemist, have invented certain new and useful Improvements in Processes and Apparatus for the Oxygenation and Polymerization of Oils, of which the following is a specification.

The present invention refers to the polymerization treatment of oils particularly linseed oil although it is also applicable for treating castor oil, which latter by the process hereinafter defined will be rendered miscible with mineral oil.

The utilization of linseed oil for printers' varnish or as a vehicle for printing inks is well known and my invention is concerned with the polymerization of same by heating within a retort and has been devised to effect simultaneous oxygenation and polymerization and the removal of the highly objectionable fetid odor created during such treatment.

Heretofore oxygenation of the oil which is known to be essential has been effected in an open vessel by forcing air into the oil by mechanically driven fan means, the oil being subsequently transferred to an open retort in which polymerization is effected, but it has not been suggested to effect both processes simultaneously and automatically, which is the primary feature of my present invention which also contemplates retention of the vapor distillates deposited by condensation.

I have also found that by my process the resultant production is of superior quality to that produced by known methods and furthermore the polymerization step can be effected in a considerably reduced period of time.

According to my invention the oil to be treated is placed in a closed retort into the bottom of which air is constantly introduced which passes upward through and creates disturbance or circulation of the liquid to the top of the retort from whence it, together with the objectionable vapors, is drawn to a drain preferably through a separating or collecting chamber for the condensed products.

The preferred method of effecting this introduction of air and withdrawing same and the vapors is by utilizing a continuous fluid pressure supply and an ejector.

The accompanying drawings are appended to indicate a practical form of apparatus in which the process is effected the illustration being a vertical section of the apparatus.

The closed metallic retort 5 is shown supported in the brick-work 6 in which the fire box 7 is provided, a Bunsen gas burner 8 being shown as the heating element.

The oil is fed to the retort 5 from the overhead supply tank 9 through pipe 10 having a control valve 11, and withdrawn by siphon pipe 12 having an external terminal draw-off tap 13. The retort is also provided with sampling taps 14, a safety valve 4 and a thermometer 15 fitted into the sealed end of the pipe 16 communicating with the oil in the retort.

Air admission for effecting oxygenation of the oil is effected by the vertical pipe 17 which has an offset or T-extension at the lower end provided with a series of orifices directing the air against the bottom of the retort. The air pipe 17 passes through the top of the retort and has its top end open to the atmosphere. The vapors generated in the retort are conducted through the pipe 18 to a chamber 19 for collecting the products of condensation. This chamber 19 is provided with a draw off tap 20 and by means of the pipe 21 communicated with the water conductor 22 which contains an ejector 23 at the point where said pipe 21 communicates with same.

The plant in use with the retort charged and subjected to heat on turning on the flow of fluid down pipe 22 the ejector 23 operates to induce air through vent pipe 17 to the bottom of the closed retort. The air so admitted passes upwardly through the oil causing oxygenation and circulation or agitation of same and together with the vapors is induced under the influence of the ejector 23 to the chamber 19 and thence to pipe 22 which is led away to a drain.

For the purpose of controlling the supply of air to the retort a control tap 24 is provided in the vent pipe 17. By means of this tap 24 the air supply can be cut off when it is required to continue the boiling of the oil without air, or when the flash point of the oil is nearly obtained and so prevent the possibility of the oil catching fire.

Thus it will be seen that in any case the ejector 23 maintains a suction on the oil in retort 5. The degree of suction during the air admission is dependent on two variable factors, one of them being the hydrostatic head varying with the liquid level in the retort, and the other the density of the oil which increases as the oxidation proceeds.

When the air is cut off entirely the partial vacuum maintained in the retort is dependent on the degree of vacuum produced by the ejector diminished by the rate of vapor generation.

I claim:—

1. The method of polymerizing and oxidizing vegetable oil, which comprises heating the oil in a directly heated retort while inducing a current of air through the body of oil by suction, and controlling the partial vacuum within the retort by controlling the rate of supply of air to the oil.

2. The method of polymerizing and oxidizing linseed oil for printers' ink varnish, which comprises rapidly heating raw linseed oil at the lowest point of the oil body in a closed retort over an open fire and inducing a current of air through the oil at its lowest point over the fire by suction in the retort above the liquid level therein.

3. The method of polymerizing and oxidizing linseed oil for printers' ink varnish, which comprises rapidly heating raw linseed oil in a closed retort over an open fire, inducing a current of air through the oil by suction in the retort above the liquid level therein, and discontinuing the supply of air when the temperature approaches the flash point of the oil and thereby increasing the degree of exhaustion above the liquid level in the retort.

4. Apparatus for polymerizing and oxidizing linseed oil, which comprises a closed retort directly heated oven an open fire, a valved air supply pipe leading into the retort to the bottom thereof over said fire and open at its upper end to the atmosphere, a water jet ejector connected by a pipe to the upper part of the retort, and a condenser inserted in said pipe between the ejector and retort.

In testimony whereof I have hereunto set my hand.

JOHN KENDRICK BLOGG.